United States Patent [19]

Hammes

[11] Patent Number: 5,167,677
[45] Date of Patent: Dec. 1, 1992

[54] VARIABLE AIR FILTER SYSTEM FOR CONVECTION AND VENTILATION AIR FLOWS

[75] Inventor: Klaus Hammes, Goldach, Switzerland

[73] Assignee: Firma Icleen Entwicklungs-Und-Vertriebsanstalt Fur Umweltprodukte, Schaan, Liechtenstein

[21] Appl. No.: 710,217

[22] Filed: Jun. 4, 1991

[30] Foreign Application Priority Data

Jun. 6, 1990 [DE] Fed. Rep. of Germany ....... 4018046

[51] Int. Cl.⁵ .............................................. B03C 3/30
[52] U.S. Cl. .................... 55/103; 55/385.2; 55/496; 55/508; 55/DIG. 35; 454/49; 237/78 B
[58] Field of Search ............ 55/103, 385.2, 467, 55/473, 493, 496, 506, 508, DIG. 35; 98/1, 105, 109; 237/78 R, 78 B

[56] References Cited

U.S. PATENT DOCUMENTS

| | | | |
|---|---|---|---|
| 1,428,150 | 9/1922 | Deleamont | 237/78 B |
| 1,596,154 | 8/1926 | Colgan | 237/78 |
| 1,660,666 | 2/1928 | Bacon | 55/DIG. 35 X |
| 1,691,967 | 11/1928 | Gammeter | 55/DIG. 35 X |
| 1,699,899 | 1/1929 | Little | 55/DIG. 35 X |
| 3,675,402 | 7/1972 | Weld | 55/496 |
| 4,518,402 | 5/1985 | Dargel | |
| 4,549,887 | 10/1985 | Joannou | 55/493 X |
| 4,682,448 | 7/1987 | Healey | 55/385.2 X |

FOREIGN PATENT DOCUMENTS

| | | |
|---|---|---|
| 1452150 | 9/1966 | France . |
| 329767 | 5/1930 | United Kingdom . |
| 790598 | 2/1958 | United Kingdom . |

Primary Examiner—Charles Hart
Attorney, Agent, or Firm—Skjerven, Morrill, MacPherson, Franklin & Friel

[57] ABSTRACT

A variable air filter system is described for convection and ventilation air flows, filter elements being introduced into the air flow in order to clean or purify the room air. To obtain an improved filtering effect, provision is made for filter elements to be disposed at a distance in front of or above the air-generating surface or the air-generating cross-section, the area of such filter elements being as large as or, if required, larger than the air-generating cross-section of the air-emitting surface. It is possible to provide the filter elements with the facility of enabling different inclination, form, overall depth, and length and height arrangement to be adjusted to the optimum value for filter efficiency in the air flow for cleaning.

17 Claims, 10 Drawing Sheets

VARIABLE AIR FILTER SYSTEM FOR CONVECTION AND VENTILATION AIR FLOWS

The present invention relates to a variable air filter system for convection and ventilation air flows, in which filter elements are disposed in the air flow in order to clean or purify the room air.

To clean or purify the room air it is known to mount appropriate filter elements on convection heaters. The conventional practical is to mount independently on the top of the heater a frame with a filter or a filter containing a filter mat. It is known to connect this filter plate directly to the heater. The hot air generated by the heater now flows partly through the material of this filter so that particles of dust, hair and other foreign substances conveyed with the air, and particularly aerosols, are separated.

A disadvantage of this known filter design is that only a small partial flow of the convection air produced by the heater passes through the filter. Experiments have shown that such arrangements either obstruct the passage of air or cannot engage parts of the air flow, since the filter is only partially contacted by the air flow.

Experiments by the applicant have shown that a cleaning effect is obtained by the fact that the relatively dry air passing through the filter effects an electrostatic charging of the filter material. Accordingly there is ionisation, on the one hand, of the filter material and opposed ionisation of the dust particles and their aerosols passing therethrough, resulting in an attraction of these particles in the filter material and a retaining effect.

It has been found that this electrostatic charging takes place only relatively weakly in the case of the known filter materials and the known method of mounting the filter plates on the heater. This is because the majority of the air does not pass through the filter without this and there are also discharge pheneomena between the heater and the filter medium namely, for example, due to the contact of the retaining frame and the heater or filter medium.

The same adverse effect, i.e. the absence of electrostatic charging, has also been found when filter elements of this kind are incorporated in the outflow apertures of corresponding air-conditioning units, with which there is again only a minor electrostatic charge and accordingly only a reduced filter retention effect.

The object of this invention, therefore, is so to develop an air filter system of the kind referred to in the preamble as to produce an improved filter effect in the area of convection and ventilation air flows.

To solve this problem, the invention is characterised in that the filter elements are disposed at an adjustable distance in front of or above the air-generating surface or the air-generating cross-section, the area of such filter elements being at least as large as or, if required, larger than the air-generating cross-section of the air-emitting surface.

The technical teaching indicated gives a number of essential advantages over the prior art.

We shall first define what is meant by "air-generating surface".

In a convection heater it is known that not only does the heating air emerge vertically upwards from the convection heater but that there are also secondary air currents so that a considerable part of the heating air also emerges in front of and behind the convection heater.

Thus a shaft forms between the wall in front of which the convection heater is mounted, and the convection heater itself, and a considerable part of the convection heating air emerges upwardly through said shaft.

Similarly, a considerably part of the convection heating air at the front of the heater passes directly upwards so that the air-emitting surface of a convection heater is much larger than the upwardly directed end face of said heater.

According to the invention, for this case, air filter elements are disposed in the entire region of this air-emitting surface of the convection heater while in a preferred embodiment the area of these air filter elements is made even larger than the air-emitting area of the heater itself.

In practice this means that air filter elements are used which are disposed at a distance above a convection heater and overlap the heater at least rearwardly and forwardly in order also to engage the secondary flows. In these conditions it is important that the air filter elements are mounted directly on the wall in order also to engage the air flow forming between the wall and the rear surface of the heater.

The term "air-emitting surface" has thus been defined for a convection heater.

Similar explanations apply to other heaters.

The same conditions apply to heaters in the form of radiators, i.e., the heat block generated by the radiator is emitted partially as a convection air flow and according to the invention the filter elements are now disposed in the region of this convection air flow, it always being important that physical contact of the filter surfaces and the filter retaining elements with the radiator itself is in every case avoided.

It is particularly advantageous in the present subject of the invention that the air is cleaned or purified in interior areas without the use of external energy.

No current supply is required nor any other operation on the part of the user.

The same conditions also apply to the filtration of air in air-conditioning units, more particularly cooling units and humidifying units and installations.

Outflow apertures for the air flow are also defined in these units.

According to the invention, it is important that filter elements are disposed at a distance in front of and overlapping the air-emitting surface. This means that there is again no physical contact between the air filter elements and the air-emitting surface itself.

It has been found that in all three applications mentioned hereinbefore for the air filter elements according to the invention the electrostatic charging is all the more intensive if physical contact between the filter elements and the air-emitting heater is avoided. There is therefore no leakage involved in respect of the electrostatic charge, because the air filter elements according to the invention are disposed in completely insulated manner separately on a mounting surface and have no electrical connection whatever to the air-emitting surface, e.g. a heater, the outflow vent of an air-conditioning installation or a radiator.

If an electrically conductive mounting rail is used, the same is mounted to be electrically insulated in an appropriate manner in relation to the mounting surface.

An essential feature of the invention is that with regard to the arrangement of the filter elements in the convention air flow it is possible to set a minimal overlap with the minimum air resistance and also, on a change of filter inclination, in conjunction with accessory means, a maximal overlap with higher air resistance. The minimal overlap occurs when the filter element is disposed projecting upwardly at an angle in the air flow, the ascending air flow passing only partially through the filter and otherwise passing along the filter in which the air is treated by penetration filtration or filter surface adsorption.

The maximal overlapping of the air flow is achieved if the filter element is inclined downwardly against the ascending air flow and, in addition, for example, an addition air shaft is disposed on the filter element to intercept the ascending air.

An accumulation of ascending air in this form is also achieved if the filter element has downwardly extending attachments which overlap the air-generating surface or if the filter element in a convex bend engages over the ascending air flow and in addition an air cushion is maintained for the filtration.

In all the exemplified embodiments it is important that a certain distance A is selected for the filter surface from the air flow, and in this way electrostatic charging of the filter medium is specifically produced, more particularly because the filter is subject to friction of the ascending air flow.

In conjunction with the electrostatic charging, accordingly, contact between the filter surface and the heater or ventilating element is avoided, thus ensuring that the resulting charge is not leaked away.

To increase the residence time of the air flow in the region of the filter medium for penetration purposes, various adjusting means are possible for the filter medium with respect to the air flow as already indicated. To avoid premature escape of the air flow provision is also made to incorporate an air shaft baffle in the filter frame.

In conjunction with the distance between the filter element and the heater or the angle to which the filter element is set, it is accordingly possible initially to set a low flow resistance. To enable specific particle sizes to be engaged, the distance can be reduced or enlarged or the angle to which the filter element is set can be adjusted, so that the filter element comes closer to the air-generating surface, and also air shaft baffles or the like may be provided. To engage the maximal air flow, depth and length determination of the air filter system is provided in conjunction with various filter element module depths and in conjunction with the angle of adjustment or inclination and the use of additional air shaft baffles (baffle plates).

The advantage of the invention is that the entire convection or inflow area can be used for filteration, and yet the heating and ventilation function can be systematically taken into account. The conjunction with the graduated filter arrangement or overlapping of the air flow both in terms of depth and length and vertically, it is possible to achieve controlled filtration of the air. In this respect there are a number of application possibilities, more particularly as follows:

1. for radiators and convectors of various types,
2. for air-conditioning window units,
3. for ventilating vents at ceilings and walls,
4. at the air inlet for cooling ventilation for computers,
5. for electrically operated wall heating elements (radiators and electrical convectors),
6. for all heat-generating units, such as refrigerators, televisions and monitors,
7. for air inlet openings, such as windows, sliding doors or the like.

In these conditions the filter elements can be disposed in a substantially straight arrangement in rows side by side, while different filter qualities can be arranged in a regular or irregular sequence for different purposes and conditions.

The filter elements can also be superposed, being disposed with throughflow apertures at different heights.

It should again be repeated that it is essential to the invention that the filter elements are disposed at a distance above or in front of the air-emitting surface. The masses of air contaminated by dust and aerosols, or air containing residual pollution, meet the filter element at a quite specific speed. In the case of a convection heater, this speed depends on the temperature of the heater and other structural details. The greater the distance between the air-emitting surface of the heater and the filter element according to the invention, the lower the air speed at which the dust and aersol meet the filter surface. There is a relation between the size of particles intercepted in the filter and the air speed. The higher the air speed, the greater the probability that small micropartices will pass through the filter.

On the other hand, the filter system must be sufficiently permeable in order reasonably not to obstruct the circulating convection air forming.

The ideal distance between the air filter elements according to the invention and the air-emitting surface depends on structural conditions and on the air-emitting surface of the heater, but should be such that the air speed ideally precisely reaches the filter so as to retain even microparticles. On the other hand the filter medium must not be so far away from the air-emitting surface of the heater as to prevent any further air or even a little air from being able to pass through the filter material. The invention is explained below with reference to a number of exemplified embodimentss. Further features and advantages of the invention will be apparent from the exemplified embodiments and the explanation thereof.

Figure 1:
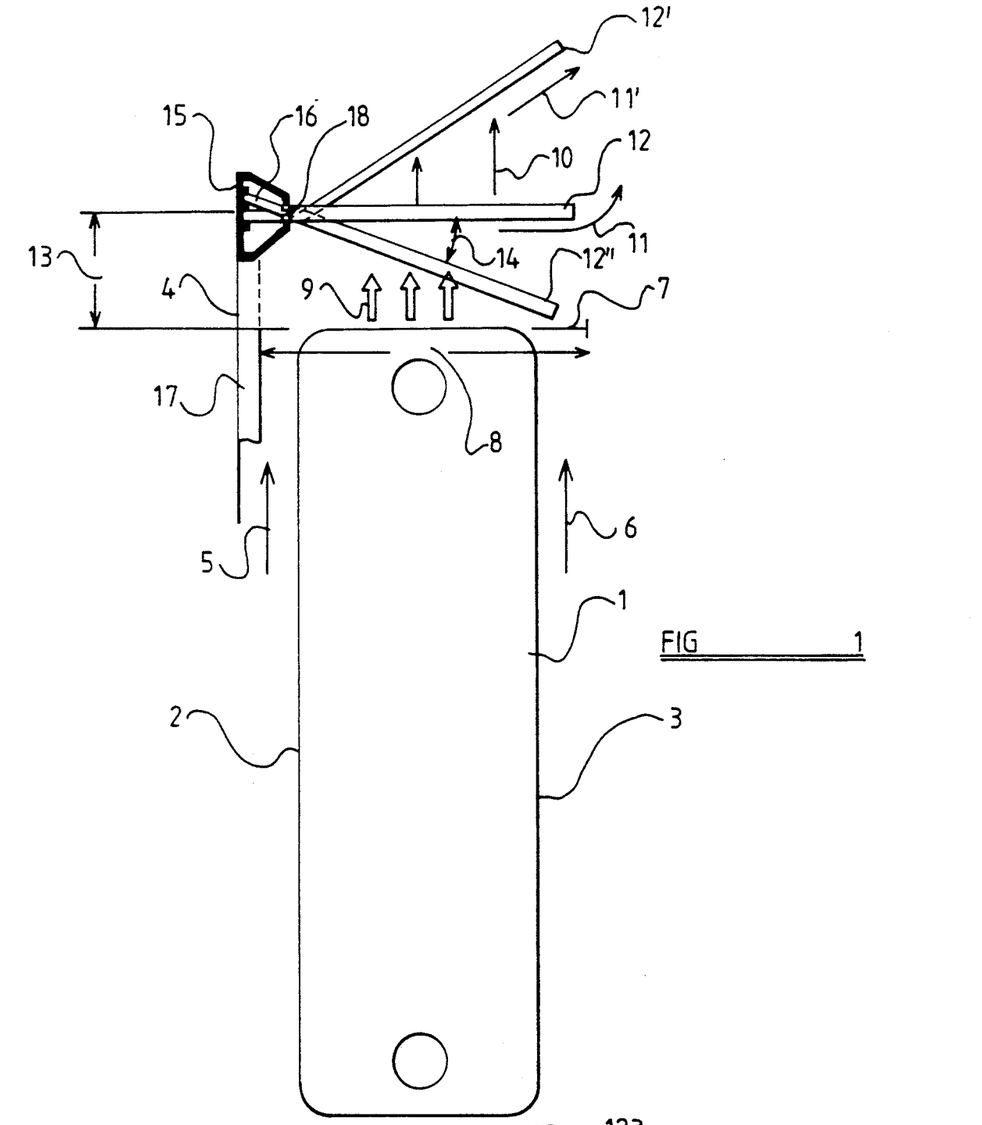
FIG. 1 is a diagrammatic side elevation of a finned radiator comprising an air filter system according to the present invention in three different positions (with and without air baffles).

FIG. 1 diagrammatically shows a heater 1, constructed, for example, as a finned radiator.

This radiator is mounted in front of a mounting surface 4 and has a back wall 2 and front wall 3. When the radiator 1 is heated, an air flow forms in known manner at the front 3 in the direction of arrow 6 and at the rear 2 in the direction of arrow 5. These convection air flows in the directions 5 and 6 extend parallel to the air flow emitted upwardly centrally from the radiator in the direction of arrow 9.

All the air flows in the directions 5, 6, 9 thus form a top air-emitting surface 7 at a distance 8 from the mounting surface 4.

It is important that the filter plates 12 according to the invention should, in the area of this air-emitting surface 7, be disposed at a vertical distance 13 above the air-emitting surface 7. This gives a superior filtering performance by the filter plates 12.

On the one hand, the air flows in the direction of the arrows 5 and 6 pass through the filter plate 12 together with the middle central air flow in the direction of the arrow 9. Accordingly, all the air flows are brought into contact with the filter medium in the filter plate 12, something which was not previously the case in the prior art.

"Bringing into contact" means that some of the air flow passes along the filter material in the direction of the arrow 11 while another part passes through the filter plate in the direction of the arrow 10 at right angles to the first flow. The two air flows in the directions 10 and 11 separate in the area of the filter plate 12.

As already stated hereinbefore, as a result of the air friction the filter plate 12 charges up electrostatically and the electrostatic charge is maintained in the filter medium because the entire arrangement is disposed on the mounting surface 4 so as to be insulating and electrically non-conductive.

It should be added that the filter plates 12 extend over the length of the radiator 1 in such manner that lateral overlap of the radiator 1 is possible and specifically selectable on both sides.

The illustration of FIG. 1 also shows another two possible embodiments of the position of the filter plates 12 according to the invention.

In the position of the filter plate 12', the latter is inclined upwardly, so that a larger volumetric flow passes along the filter plate 12 in the direction of arrow 11' and only a smaller air flow passes through the filter material in the direction of the arrow 10.

The heating capacity of the radiator is thus only influenced to the minimum degree.

In the position 12", the filter plates are inclined downwardly in the direction of the arrow 14, so that here a greater air flow passes through the filter plates 12" in the direction of arrow 10 and a smaller air flow is deflected along the filter plates in the direction of arrow 11.

Figure 1A:
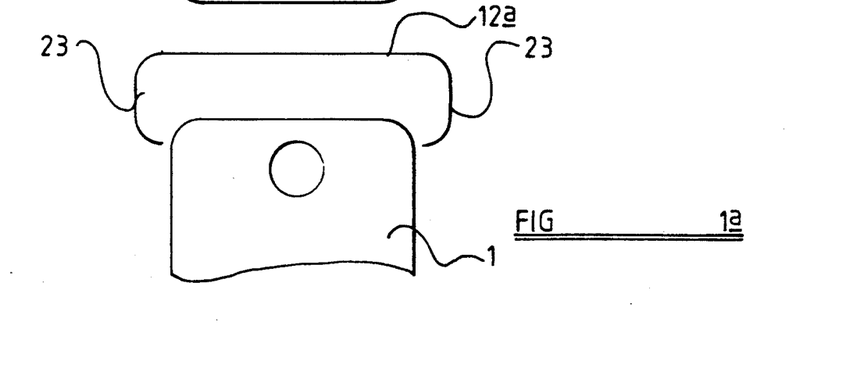
FIG. 1a shows filter elements with bent-off parts or attachments on both sides.

According to the invention, provision is additionally made for the specific case in which, as shown in FIG. 1a, to intercept the air flow in the direction of arrow 6 forming at the front of the radiator 1, attachments 23 or collars which extend substantially vertically downwards are also provided on the filter plates 12 to form an air pocket or an air barrier above the filter plates 12 in order thus to improve the residence time of the air flow beneath the filter plate and reduce the air flow in the direction of arrow 11.

Air collars of this kind are used only in part and are not absolutely essential to the solution.

The filter plates 12 are each mounted for displacement in a mounting rail 15 extending over the entire length of the radiator. The displacement is effected at right angles to the drawing plane, while in addition provision can be made for the filter plates 12 to be disposed in the mounting rail so as to be pivotable in the direction of the arrow as shown and in the opposite direction thereto.

The mounting rail comprises a hollow profile 16 with a front fixing groove or slot 18 through which the filter plates 12 are pushed and held there.

The mounting rail 15 may consist of a metal material or a plastic material. The only important feature is that there should be no electrical connection between the filter plates, on the one hand, and the radiator 1, on the other hand, or the ventilation element.

To complement the present invention and in a development, provision is made for an additional filter strip 17 to be disposed on the mounting surface 4 beneath the retaining profile and behind the radiator 1, filter strip 17 preferably extending over the entire length of the radiator. In this way the filter effect can be increased by an additional contact separation. This is effected by the additional filter strip 17 having an absorption effect with respect to the passing air particles.

Figure 1B:
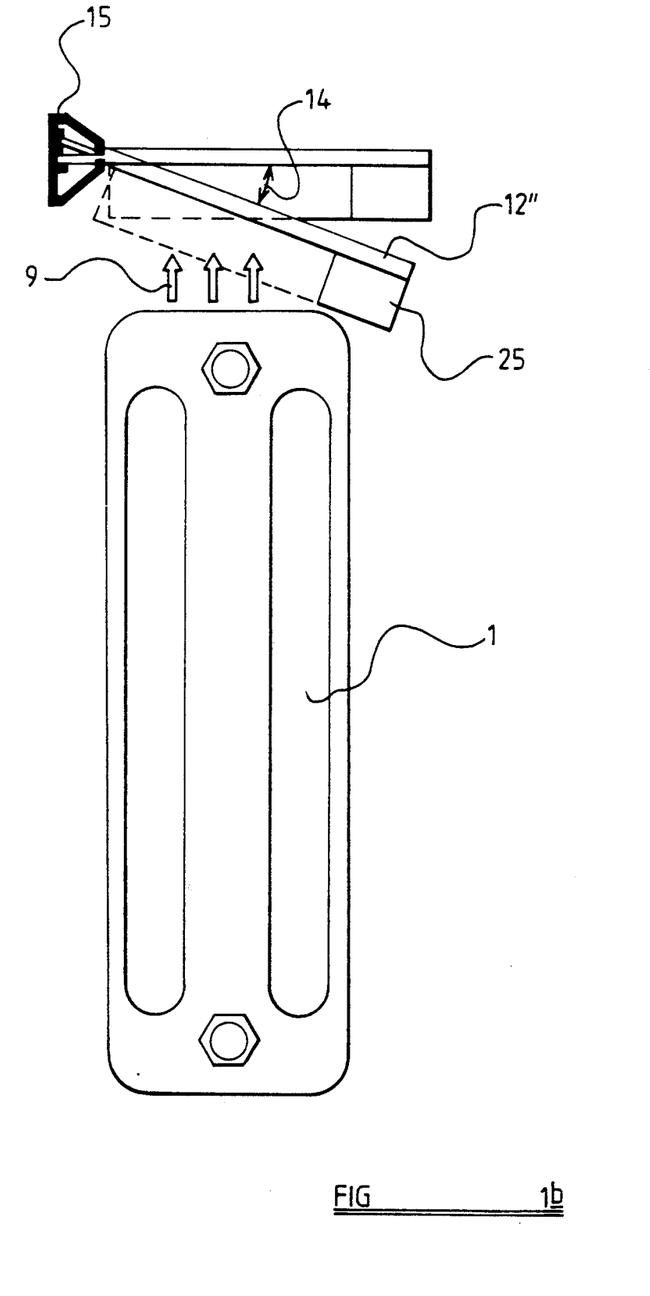
FIG. 1b shows the embodiment according to FIG. 1 with additional air baffles.

FIG. 1b shows that baffle plates 25, 26 may be disposed on the filter plates in all the embodiments described hereinbefore and hereinafter, such baffle plates extending substantially vertically downwards from the plane of the filter plate. An air shaft 24 or the like is formed as a result.

In these circumstances, the baffle plates 25 secured to the filter plates disposed at the edges may be bent round into the front corner of the baffle plate and assume either the configuration of the baffle 25 shown in FIG. 1b or the configuration of the baffle 26 in the broken-line embodiment shown in FIG. 1b.

The baffles disposed on the other filter elements may either have likewise bent-off corners, as shown in the case of the baffle 25 in FIG. 1b, or they may simply be straight at the end faces.

Figure 1C:
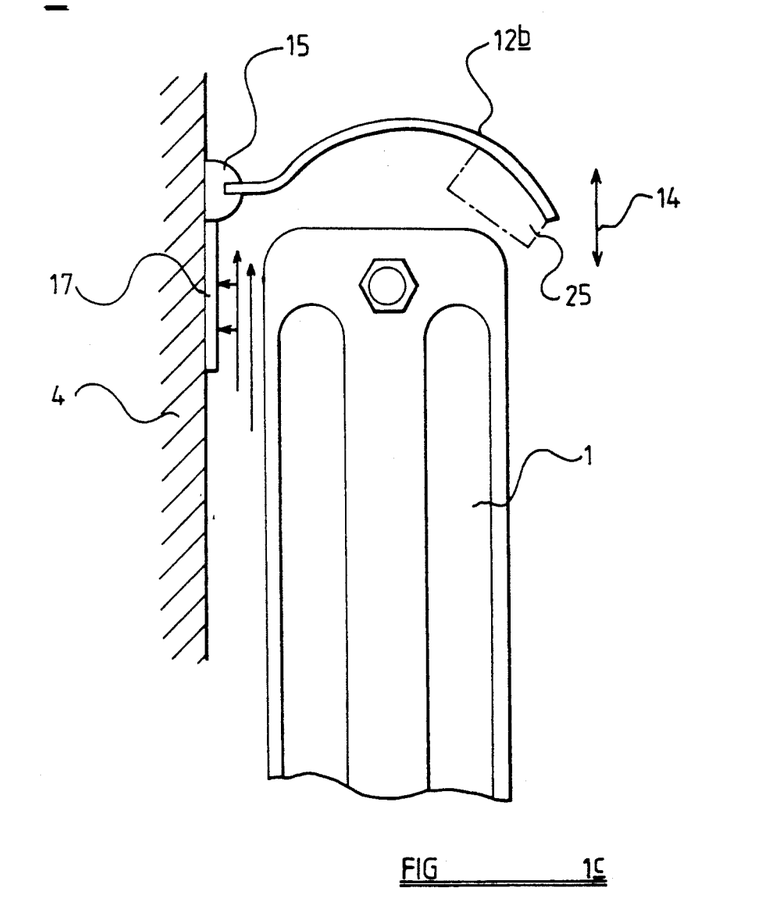
FIG. 1c shows bent-off filter elements with an attached air shaft.

FIG. 1c shows a radiator with filter elements 12b disposed thereabove, such filter elements in a convex or bent construction overlapping the ascending air flow. In addition, an air shaft 24 is provided, in order to intercept a considerable part of the ascending air flow in this arrangement by maximum overlapping. FIG. 1b shows that in this embodiment too the filter element 12b can be set to different angles of inclination, for example, to enable a reduced air resistance to be set in the case of otherwise clean air.

Figure 2:
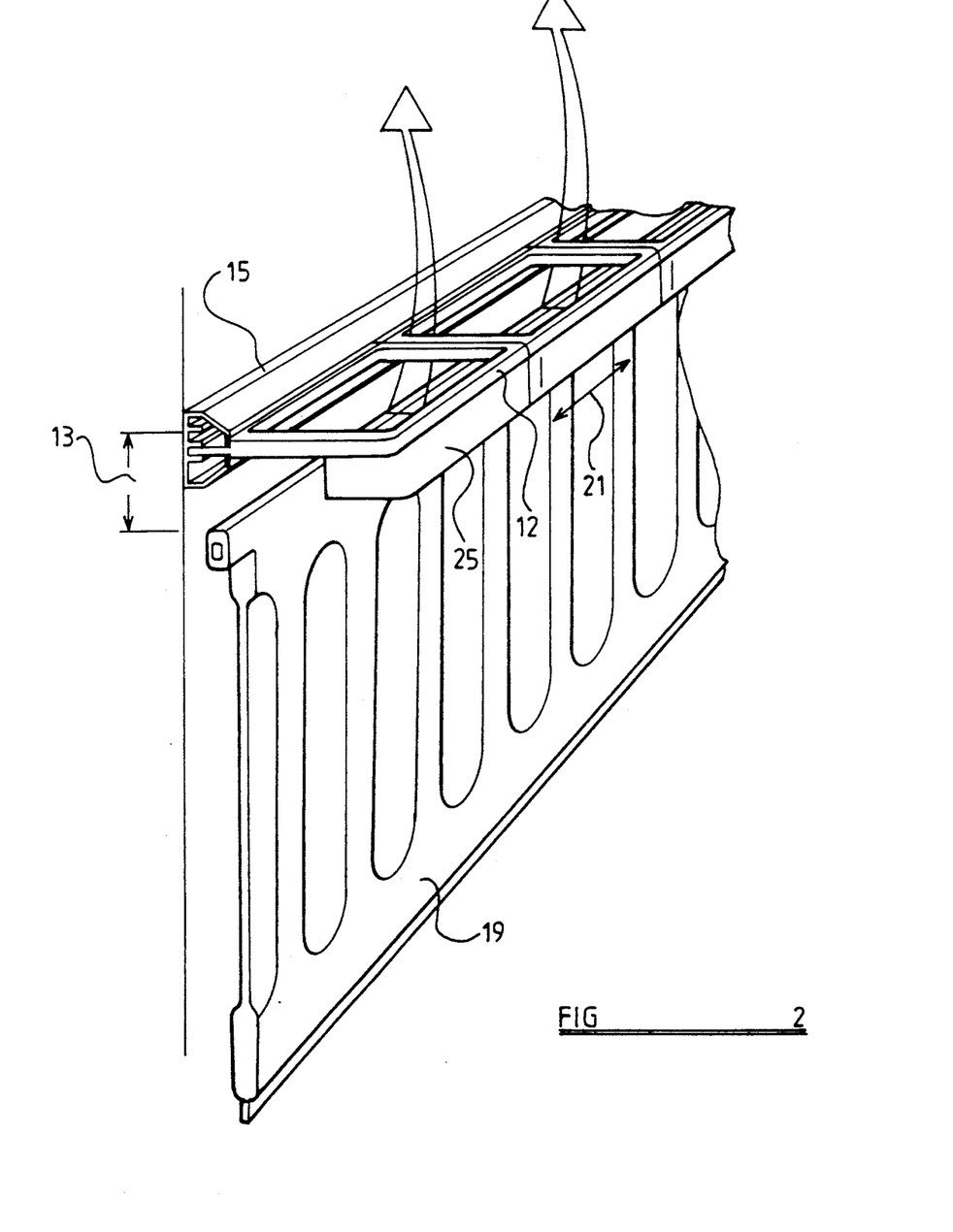
FIG. 2 shows the use of an air filter system according to the invention in perspective above a panel radiator.

FIG. 2 diagrammatically illustrates the filter plates 12 mounted in front of a panel radiator 19.

For constructional reasons in this case the use of a continuous filter mat extending over the entire length of the radiator is avoided. According to the invention, this filter mat is divided up into individual filter elements (modules), and each filter element forms a filter plate 12, each filter plate consisting of a frame element and the filter itself in different formats.

The filter is clamped in the frame part by means of a rubber clamping means. In the exemplified embodiment illustrated, the frame part 20 is rectangular to guarantee the optimum covering of the panel radiator 19. This guarantees that there is a continuous covering of the flow of the panel radiator 19.

It is important that the distance 13 between the mounting rail 15 and the panel radiator 19 is selectable and can be adapted to the appropriate requirements at the installation site, in order to achieve the filter effect required at any time.

It is also important that the filter plates 12 are held in the mounting rail so as to be displaceable in the directions of the arrows 21 or can be arranged contiguously so as to guarantee a stepless and gapless covering of the air-emitting surface of the panel radiator.

In these conditions provision may be made for different filter materials to be disposed in the respective consecutive frame parts (note: separate sub-claim for this). This arrangement of different filter materials is advantageous, for example, in cases involving the use of chemicals or the metering thereof for the room air volume. Chemicals in a specific metered quantity may be associated with some individual filter elements and not with others, so that here again the passing air flows can be dealt with in variable manner.

In all the embodiments it is important that the filter elements can be disposed not only in a substantially horizontal plane above the air-emitting surface, but that other filter elements can also be disposed at an angle to this plane of the first-mentioned filter elements.

In the exemplified embodiment shown in FIG. 2, therefore, it is possible to provide another filter plate arrangement parallel to the plane of the panel radiator 19 at right angles to the horizontal filter plates 12 to give a continuous closure to the air, the additional filter plate arrangement being mounted on a stand and disposed in front of the panel radiator 19.

Figure 3:
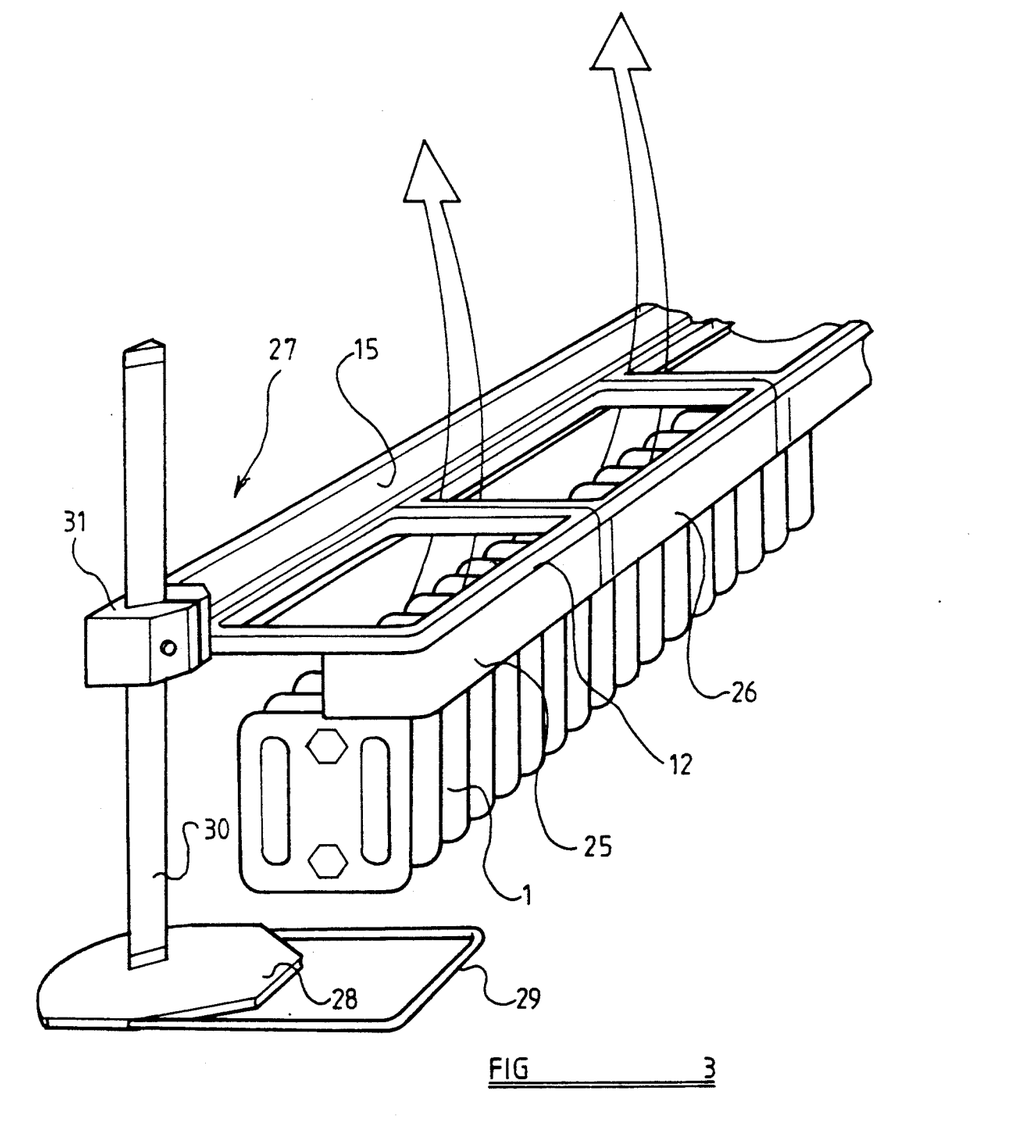
FIG. 3 shows the use of the air filter system according to the invention above a convector heater.

FIG. 3 shows a modified embodiment of FIG. 2. This relates to a convection heater above which the filter plates are disposed in a similar manner to that shown in FIG. 2.

Here a stand 27 is used which consists essentially of a base part 28, the standing area of which can be enlarged by means of a larger frame 29 connected to the base part 28.

A retaining tube 30 is disposed on the base part 28 and on it a holder 31 is mounted for vertical adjustment, the mounting rail 15 being connected thereto.

By adjusting the holder 31 on the retaining tube 30 it is thus possible to set any desired height (within the structural limitations) above the heater 1 for the filter plates 12.

Here too the provision of central straight baffles 26 and baffles 25 bent away at the edges and releasably mounted on the filter plates 12 is shown as an exemplified embodiment.

Figure 4:
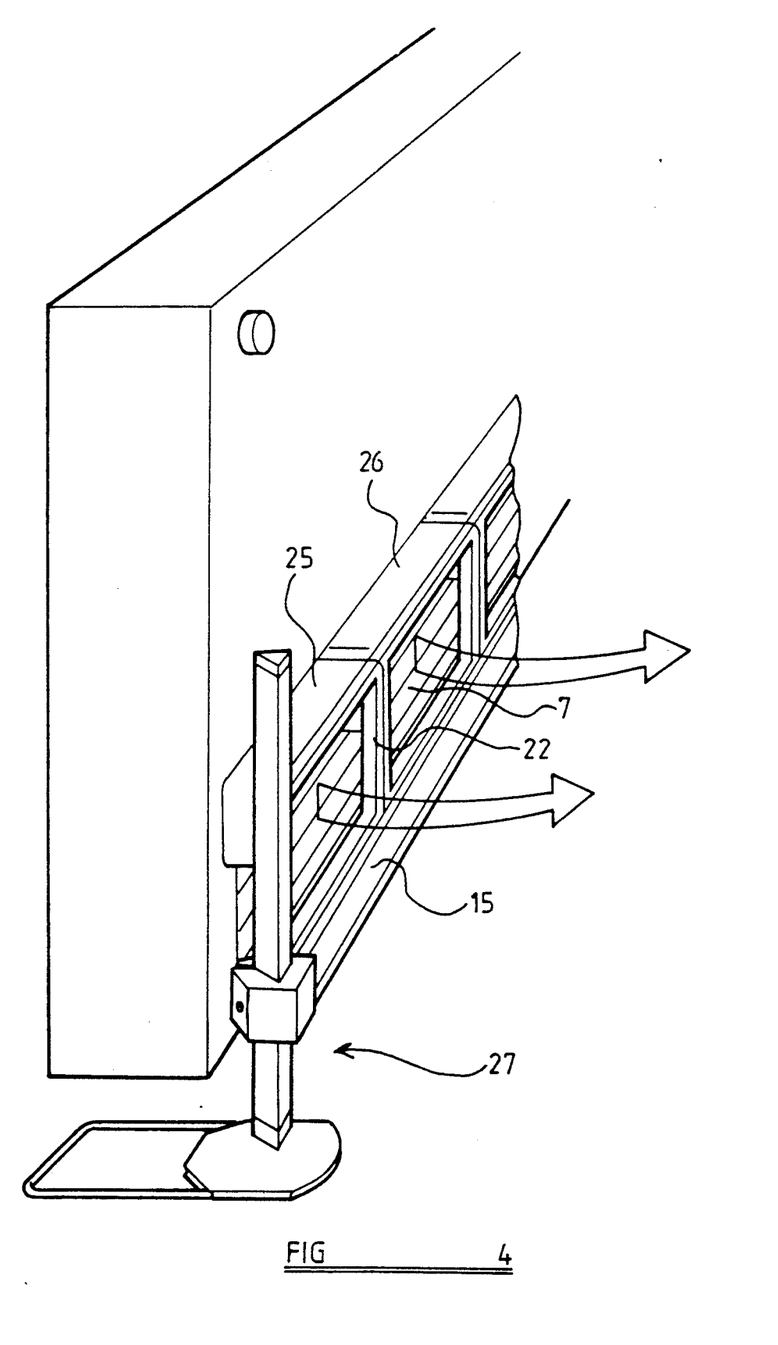
FIG. 4 shows the air filter system diagrammatically in front of the outflow aperture of a night storage heater or an air-conditioning system.

FIG. 4 shows an air convection installation which can be constructed either as an air-conditioning system (cooling or heating) or as a humidifying system.

In this case it is important that the filter plates according to the invention are disposed in front of and at a distance from the outflow vent 22.

Of course if there are other outflow vents, for example in the top horizontal surface of this device, then corresponding filter plates according to the invention are also disposed there at a distance above said outflow vent.

Figure 5:
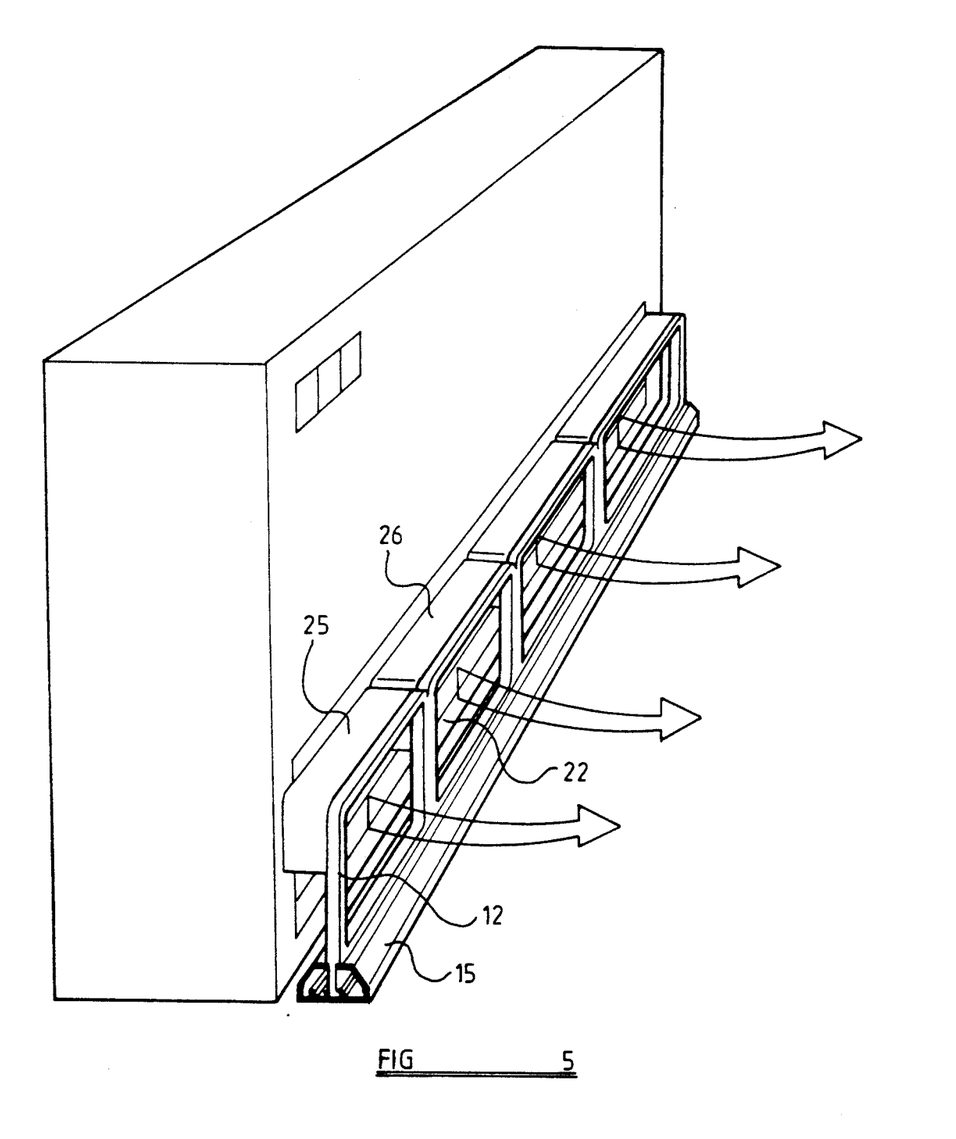
FIG. 5 shows the same arrangement as FIG. 4 with another mounting for the air filter system.

FIG. 5 shows a night storage heater in which the filter plates according to the invention are again disposed at a distance in front of the outflow vent 22.

Here, the filter plates 12 are mounted in a mounting rail 15 fixed on the floor, while in the exemplified embodiment shown in FIG. 4 the mounting rail 15 was fixed on the stand 27 so as to be vertically adjustable.

As stated hereinbefore, the present invention is suitable for the filtration of all air currents produced by convection or ventilation. For this reason, provision is also made according to the invention to mount the filter elements according to the invention above the air outflow vents, for example of televisions, monitors, refrigerators and the like. These cases also involve the required passive air cleaning effect (i.e. without external energy), which takes place comparatively automatically.

In addition, the filter elements according to the invention can also be disposed in the area of the openings of sliding doors, tilting windows and the like, where there is also a (natural) ventilation air current. In this case, the air entering the room from outside is purified by the filter plates incorporated in the air flow.

Figure 6:
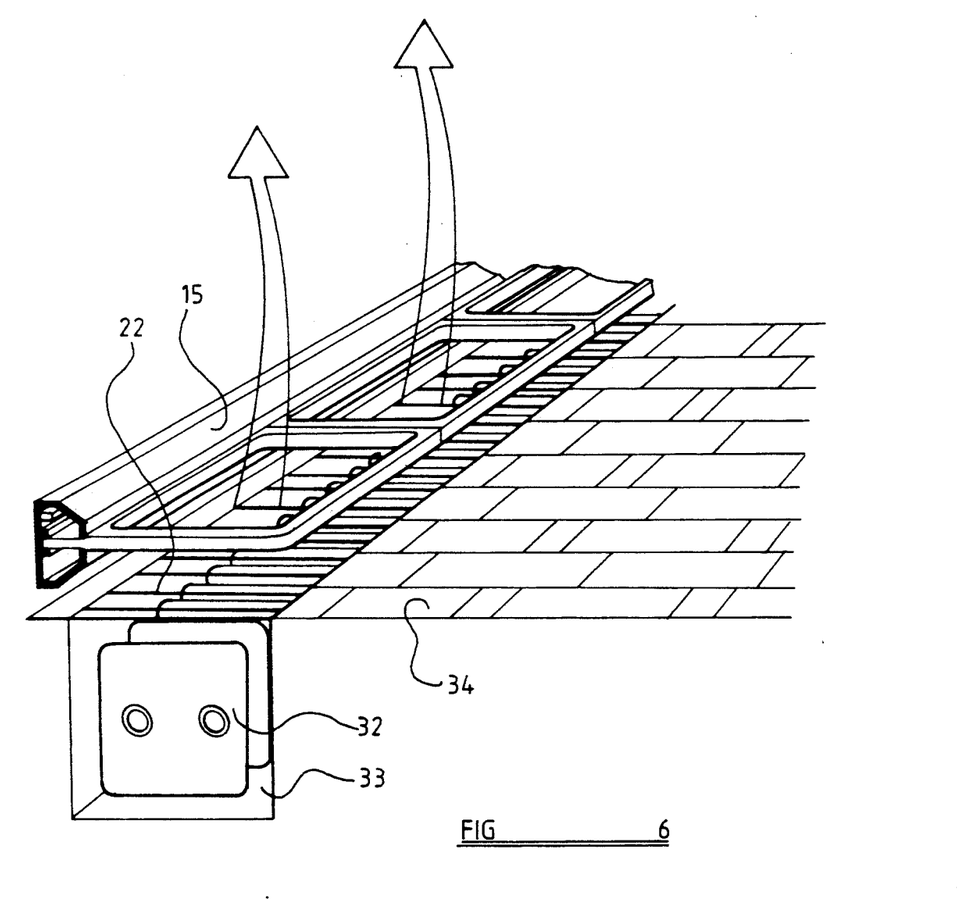
FIG. 6 shows the arrangement of air filter elements according to the invention in the region of a convector floor heater.

In the exemplified embodiment shown in FIG. 6, a shaft 33 is formed in a floor 34 and contains a convector 32. The filter plates 12 according to the invention are disposed above the air outflow vents 22. In this case, as in the previous description, the filter plates are mounted adjustably in a mounting rail 15 held on the wall side.

Figure 7:
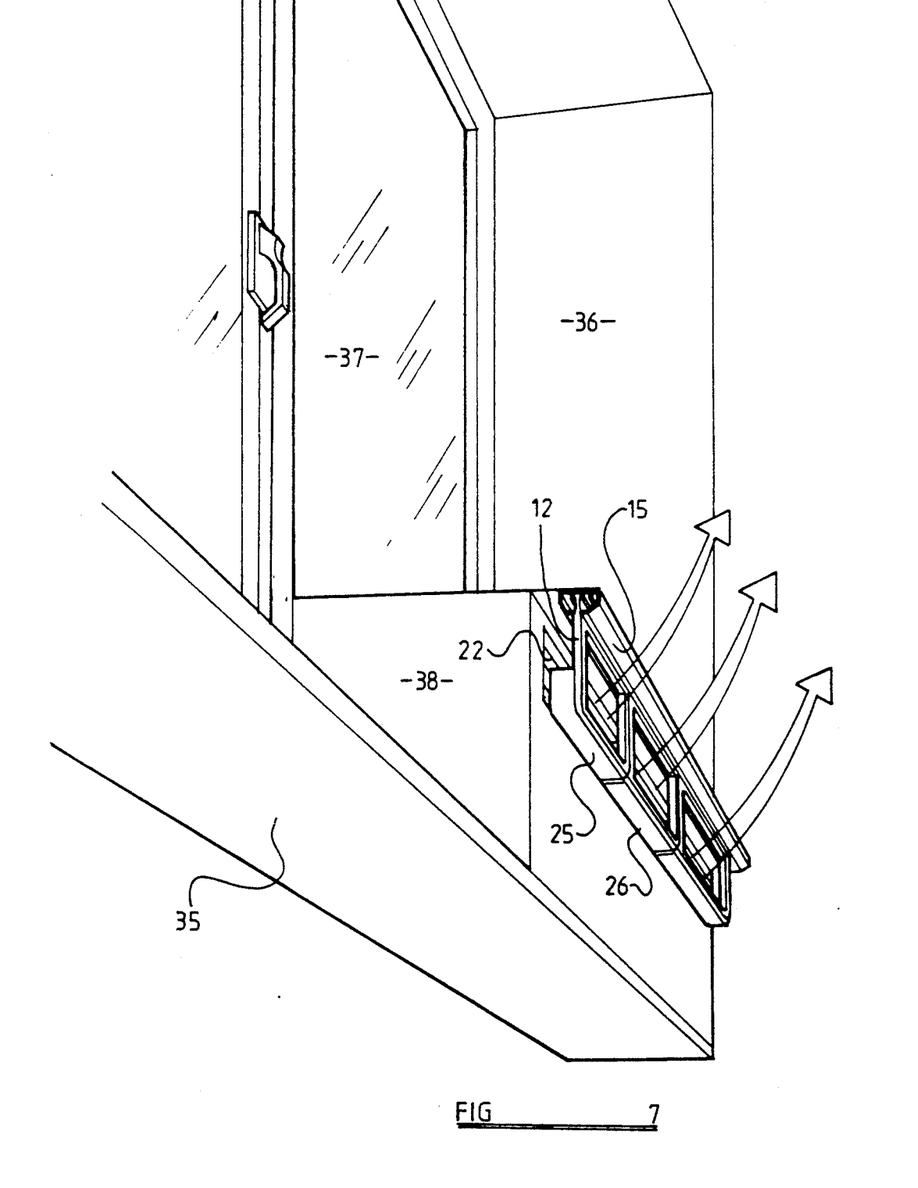
FIG. 7 shows the mounting of air filter elements in a window air-conditioning system.

In the exemplified embodiment shown in FIG. 7, a window sill 35 on which an air conditioning unit 38 with outflow vents 22 is disposed, is disposed in a bay 36 beneath a window 37.

Here again the filter plates 12 are mounted on the mounting rail 15 in the region of the window bay 36.

Figure 8:
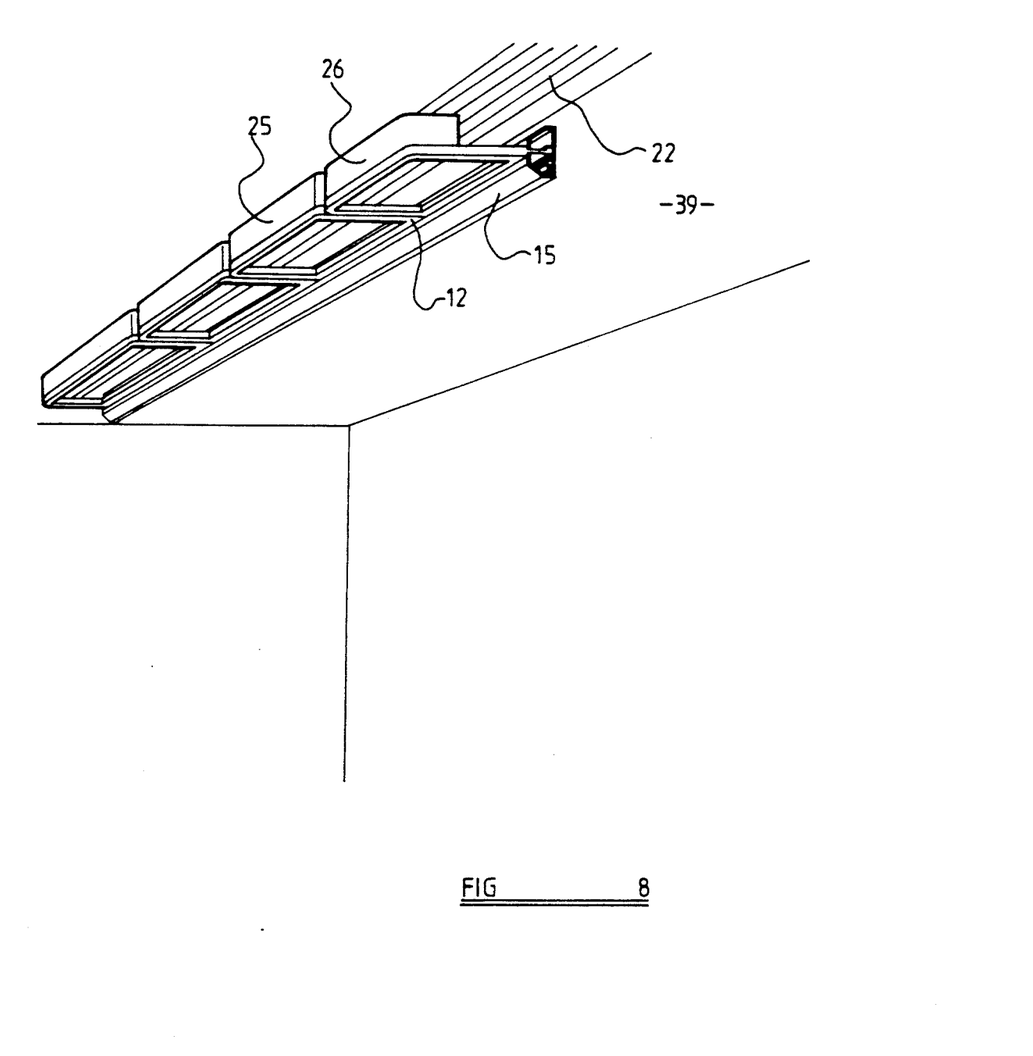
FIG. 8 shows the mounting of air filter elements according to the invention on outflow vents disposed in a ceiling.

In FIG. 8, outflow vents 22 are disposed in the ceiling, the filter plates 12 again being disposed in front of them by means of the mounting rail 15.

In order to seal off the entering air flow on the ceiling side, baffles 25, 26 are provided, which should be disposed as close as possible to the ceiling 39.

To summarise, the invention solves the problem of obtaining cleaning or purification of room air by the use of existing circulation or ventilation currents without any additional energy costs. In these conditions the filter system can be minimised or maximised as regards air penetration, while allowing for the functions of heating and ventilating systems.

I claim:

1. A variable air filter system for convection and ventilation air flows comprising a filter element for cleaning or purifying room air, an air-emitting surface or an air-generating cross-section, the filter element being disposed in the air flow and at an adjustable distance from the air-emitting surface or the air-generating cross-section, the area of said filter element being as large as or larger than the air-generating cross-section or the air-emitting surface, the filter element being electrically insulated so as to facilitate the build up of an electrostatic charge on the filter element from the operation of the air flow.

2. An air filter system according to claim 1, wherein the area of the air filter element is larger than the air-emitting surface or the air-generating cross-section.

3. An air filter system according to claim 1, wherein the air filter element is disposed on a mounting rail so as to be electrically insulated.

4. An air filter system according to claim 3, wherein the mounting rail has a plurality of adjustment facilities for different angular positions of the filter element.

5. An air filter system according to claim 3 wherein the mounting rail is disposed on a vertically adjustable stand.

6. An air filter system according to claim 1, wherein the filter element has a downwardly projecting attachment along at least one side thereof.

7. An air filter system according to claim 1, wherein the filter element extends across the air flow in a convex bend.

8. An air filter system according to claim 1, wherein the filter element bounds an upper region of a downwardly extending air shaft by baffles extending downwardly from the sides of the filter element.

9. An air filter system according to claim 1, wherein an additional filter element is provided as an adsorption strip on a mounting surface in the region of a secondary air flow.

10. An air filter system according to claim 1, wherein the filter element has a frame part into which the filter material is inserted and fixed by a clamping strip.

11. An air filter system according to claim 1, wherein a plurality of filter elements are provided.

12. An air filter system according to claim 11, wherein the filter elements are provided in a superposed arrangement, the filter elements being disposed in a staggered arrangement at different distances from the air-emitting surface or the air-generating cross-section.

13. An air filter system according to claim 11, wherein the filter elements are disposed as discrete elements close together at equal distances from the air-generating surface.

14. An air filter system according to claim 11, wherein the filter elements are provided with different material in a varying arrangement.

15. An air filter system according to claim 11, wherein the filter elements comprise a filter material and an air filter frame which consists of a contiguous arrangement of individual frame elements individually receiving the filter material.

16. An air filter system according to claim 15, wherein baffles are adapted to be attached to the air filter frame by way of detent grooves or slots.

17. An air filter system according to claim 11, wherein the air filter elements are formed of metal and are connected to an electrical circuit by means of which they have contact with an electrically connected retaining profile, thereby causing the filter element to be charged.

* * * * *